United States Patent [19]

Holmes et al.

[11] Patent Number: 4,727,751
[45] Date of Patent: Mar. 1, 1988

[54] CROSSFLOW VORTICITY SENSOR

[75] Inventors: Bruce J. Holmes, Newport News; Debra L. Carraway, Norfolk; Harlan K. Holmes, Newport News; Thomas C. Moore, Poquoson, all of Va.

[73] Assignee: The United States of America as represented by the Administrator of the National Aeronautics and Space Administration, Washington, D.C.

[21] Appl. No.: 3,676

[22] Filed: Jan. 15, 1987

[51] Int. Cl.⁴ ............................................. G01M 9/00
[52] U.S. Cl. .................................... 73/147; 73/178 R
[58] Field of Search ............. 73/147, 195, 204, 178 R, 73/178 T, 178 H, 755, 181; 374/137, 144

[56] References Cited

U.S. PATENT DOCUMENTS

| 4,158,236 | 6/1979 | Levy | 364/900 |
| 4,435,695 | 3/1984 | Maris | 73/147 |
| 4,445,196 | 4/1984 | Gonet | 364/900 |
| 4,563,684 | 1/1986 | Maris | 73/147 |

Primary Examiner—Donald O. Woodiel
Attorney, Agent, or Firm—George F. Helfrich; John R. Manning

[57] ABSTRACT

A crossflow vorticity sensor is provided for the detection of crossflow vorticity characteristics. The crossflow vorticity sensor is comprised of crossflow sensors (10) which are non-invasively adhered to swept wing laminar surface (12) either singularly, in multi-element strips (11), in polar patterns (40), or orthogonal patterns (41). These crossflow sensors (10) are comprised of hot-film sensor elements (18) which operate as a constant temperature anemometer circuit to detect heat transfer rate changes. Accordingly, crossflow vorticity characteristics are determined via cross-correlation. In addition, the crossflow sensors (10) have a thickness which does not exceed a maximum value h in order to avoid contamination of downstream crossflow sensors (10).

9 Claims, 7 Drawing Figures

CROSSFLOW VORTICITY SENSOR

ORIGIN OF THE INVENTION

The invention described herein was made jointly in the performance of work under NASA Grant No. NAG-1-387 with the Old Dominion Research Foundation and employees of the U.S. Government. In accordance with 35 USC 202, the grantee elected not to retain title.

BACKGROUND OF THE INVENTION

This invention relates to the measurement of laminar flow over airfoils and more particularly to the determination of the existence and location of crossflow vorticity disturbances and transition to turbulence on laminar flow surfaces.

The accurate determination of both the location and cause of boundary-layer transition from laminar to turbulent flow is important in basic research for validation of theory and design. A determination of the locations of laminar and turbulent flow on the surfaces of wings, empennage, fuselage, and engine nacelles aids in this basic research. The transition to turbulence of three dimensional laminar boundary layers such as on swept wings or nonaxisymmetric bodies can be caused by any individual or combination of six different instabilities or disturbances. These six modes of instabilities or disturbances are inflectional instability in the free-shear layer across a laminar separation bubble, acoustic disturbances, roughness or waviness of the flow surfaces, catastrophic amplification of two-dimensional wavelike (Tollimien-Schlichting) disturbances, attachment line contamination, and crossflow vorticity. Crossflow vorticity results from the combined effect of streamwise and spanwise pressure gradients in the boundary layer and can form three-dimensional vortical disturbances which grow to cause transition to turbulence.

Prior methods of determining the crossflow vorticity in laminar flow utilize visual, electronic, and optical techniques. First, the visual technique involves observing surface coatings such as oil and sublimating chemicals to provide distinctive streamwise streaks indicative of the crossflow vorticity and the ensuing transition front. However, low temperatures (about −20° C.) of flight tests conducted at high altitudes (above approximately 20,000 feet) render sublimating chemicals useless. Also, neither oil flow nor sublimating chemicals can provide several data points for a given test flight or wind tunnel run. Also, the locations of maximum amplitude of the crossflow vorticity are not readily apparent using these visualization methods. Thus, if data are required over a range of test speeds or angles of attack, the visual techniques are expensive and time-consuming. Second, the electronic technique involves mounting multiple hot-wire probes on the surface. These hot wire probes extend into the boundary layer, causing a local transition wedge to form in the downstream direction. Thus, measurements made in the chordwise direction require a longitudinal traversing mechanism or will require staggered sensors to avoid contamination of a downstream probe by an upstream probe. Hot wire probes are also inappropriate for many flight tests. Mounting a longitudinal traversing mechanism on a wing for flight can entail unacceptable costs and complexity. Also, many holes would have to be drilled in the wing for support. This is impractical for many test airplanes. The necessary hot wire sensing elements would need to be small. Airframe vibrations increase the likelihood of failure of these fragile elements. Also, since the hot wire probes would be large in comparison with crossflow vorticity patterns, good spatial resolution of the pattern of crossflow vorticity wavelengths may not be obtainable. Third, the optical technique involves laser velocimetry to measure crossflow vorticity. This technique includes large and expensive equipment. Also, the flow must be "seeded" with microscopic particles of materials such as latex rubber, alcohol, or clay particles, thereby excluding this optical technique from some wind tunnel tests and from practical flight tests.

Accordingly, it is an object of this invention to detect crossflow vorticity both electronically and non-invasively.

It is a further object of this invention to detect crossflow vorticity resulting from variable freestream conditions during a single flight test or wind tunnel run.

A further object of this invention is to detect the spatial (i.e., wavelength) and time-dependent behavior (e.g., frequency of non-stationary instability) of crossflow vorticity.

A further object of this invention is to measure crossflow vorticity in a simple, cheap, and spatially efficient manner.

Other objects and advantages of this invention will become apparent hereinafter in the specification and drawing which follow.

SUMMARY OF THE INVENTION

According to the present invention, the foregoing and additional objects are obtained by using crossflow sensors comprising various geometric arrays of thin hot-film sensors mounted on the surface of the airplane or model. As crossflow vorticity develops, local heat transfer occurs between the airflow and the hot-film sensors. Each hot-film sensor is operated as a constant temperature anemometer. Thus, the voltage required to maintain constant temperature is proportional to the heat transfer. This voltage, coupled with a proper selection of hot-film sensors, surface area and spacing between hot-film sensors, can be readily interpreted to provide an accurate indication of the existence of crossflow vorticity. Also, the crossflow sensors have an appropriate thinness to avoid creating a local transition wedge.

DETAILED DESCRIPTION OF THE INVENTION

Figure 1:
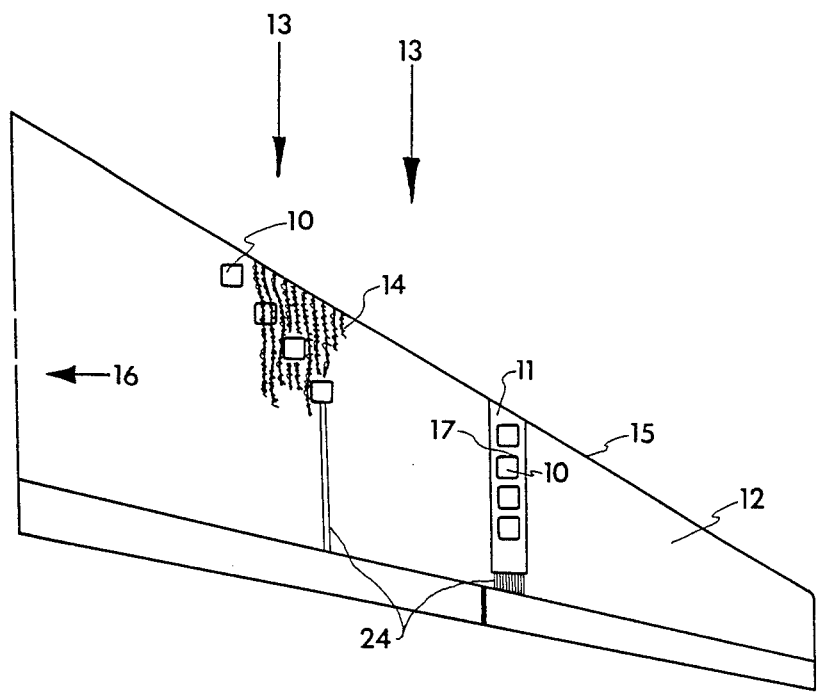
FIG. 1 is a pictorial view of crossflow sensors mounted on an airplane wing in accordance with the present invention.
Figure 2A:
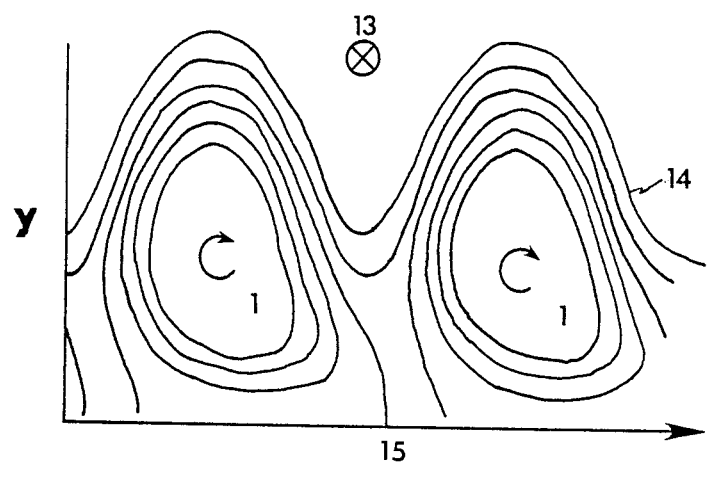
FIG. 2A is a graphic representation of crossflow vorticity.
Figure 2B:
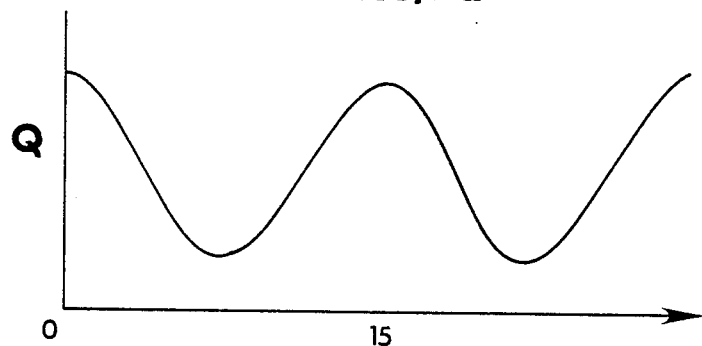
FIG. 2B is a graphic representation of the local heat transfer between the crossflow vorticity and the surface of a model or airplane.
Figure 5:
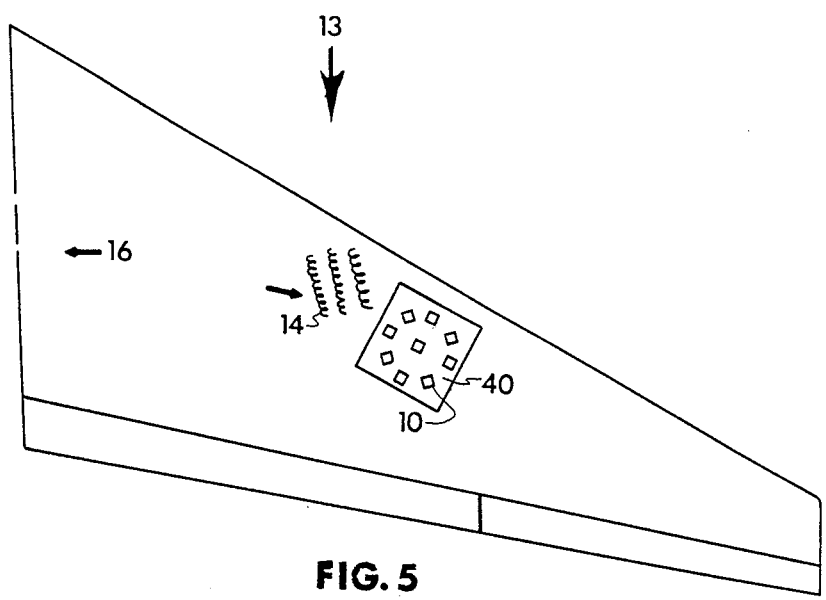
FIG. 5 is a top view of a polar pattern of crossflow sensors.
Figure 6:
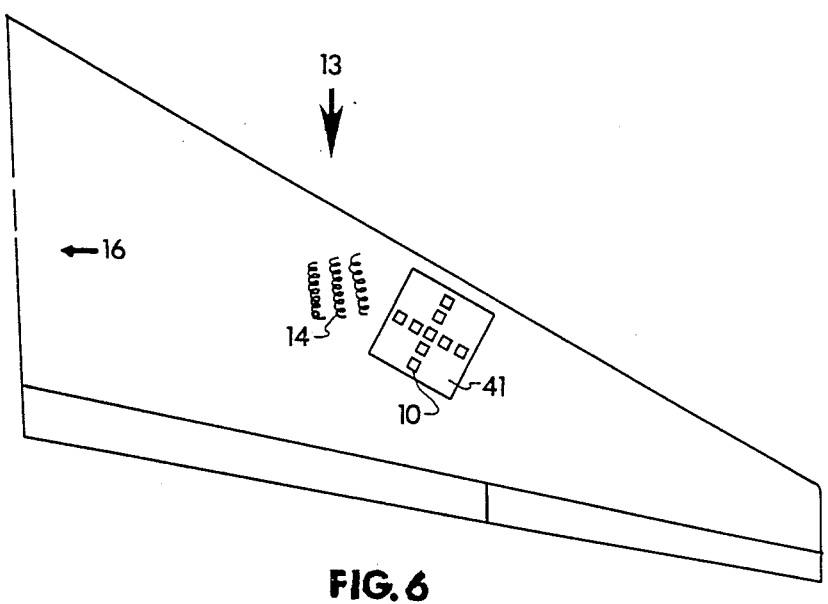
FIG. 6 is a top view of an orthogonal pattern of crossflow sensors.

As illustrated in FIG. 1, crossflow sensors 10 are adhered to a swept wing laminar surface 12. When the freestream 13 comes into contact with leading edge 15 of swept wing laminar surface 12, boundary layer flows are formed both in the direction of freestream 13 and spanwise direction 16. These boundary layer flows result in a velocity profile which is inflected to create crossflow vortices 14. If the boundary layer is laminar, the crossflow vortices 14 can grow in strength and result in a transition to turbulence. Referring now to FIGS. 2A and 2B, large variations exist in the local heat transfer and skin friction between the crossflow vorticity 14 and swept wing laminar surface 15 in spanwise direction 16. Referring again to FIG. 1, the existence of crossflow vorticity 14 can thus be detected by using crossflow sensors 10 to sense these variations in heat transfer and skin friction. Crossflow vorticity characteristics may then be determined by correlating times of crossing of crossflow vortices through various arrangements of crossflow sensors 10, i.e., by cross-correlation. These crossflow sensors 10 may be individually situated or organized in a multi-element strip 11. Multi-element strip 11 is oriented lengthwise in the direction of freestream 13 to sense the growth of crossflow vorticity 14 downstream. If individual crossflow sensors 10 are arranged in a staggered fashion, spanwise variations in crossflow vorticity 14 will be detected. Referring now to FIG. 5, the crossflow sensors 10 may also be arranged in a polar pattern 40 to determine the wave angles of moving crossflow vortices 14 by cross-correlation. Accordingly, wave angles and frequency of crossflow vortices 14 are determined by measuring the time dependent response of polar pattern 40. Referring now to FIG. 6, the crossflow sensors may also be arranged in an orthogonal pattern 41 to detect desired wave angles and frequency of moving crossflow vortices 14 by cross-correlation.

Figure 3:
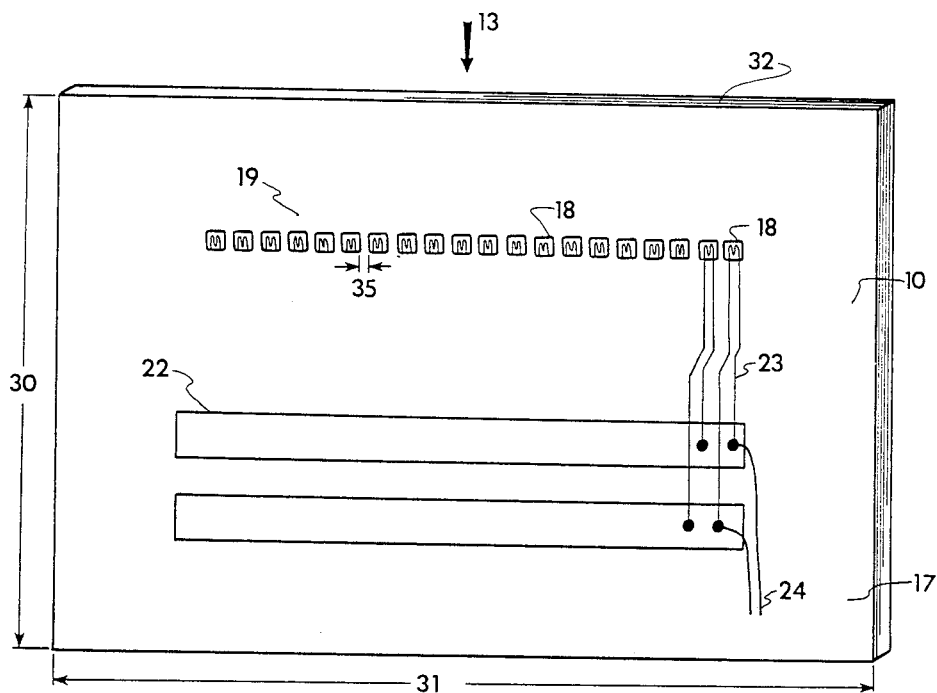
FIG. 3 is a detailed view of a crossflow sensor comprising hot-film sensor elements.
Figure 4:
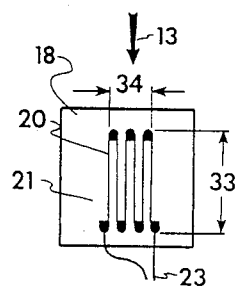
FIG. 4 is a top view of a hot-film sensor element.

Referring now to FIG. 3, a crossflow sensor 10 comprising a substrate 17, solder pads 22, and hot-film sensor elements 18 organized into a hot-film sensor array 19 is shown. The substrate 17 can be constructed of a polyimide film, e.g., Kapton ® polyimide film which is available from the Dupont corporation. The substrate 17 shown has a length 30 of 1.0", a width 31 of 1.5", and a thickness 32 of 0.001". Referring now to FIG. 1, substrate 17 is either non-invasively adhered to swept wing laminar surface 12 or fixed to a multi-element array 11, which is non-invasively adhered to swept wing laminar surface 12. Referring now to FIG. 4, a hot-film sensor element 18 is shown comprising hot-film element 20, preferably constructed of nickel, and hot-film element backing 21, constructed of a polyimide film. Hot-film element 20 is fixed to hot-film backing 21, which is fixed to substrate 17. The mounted hot-film element 20 shown has a length 33 of 0.100" and a width 34 of 0.025". To avoid formation of a local turbulent wedge in the downstream direction and thereby contaminate downstream crossflow sensors 10, the total frontal thickness 32 of crossflow sensor 10 (i.e., the thickness of substrate 17 (0.001") plus the thickness of the adhesive used for installation of substrate 17) should not exceed h, where h is defined by the following equation:

$$h = \frac{1800 \times 12}{R'} \quad \text{Equation (1)}$$

where $R'$ is the unit Reynolds number of freestream 13. $R'$ is equal to $u/\nu_\infty$ where u is the freestream velocity measured in ft/sec and $\nu_\infty$ is the kinetic viscosity in sec/ft$^2$. For example, when $R' = 3 \times 10^6$ ft$^{-1}$, an allowable height h is 0.007 inches. The heat sensor elements 18 should be oriented with the length 33 in the same direction as the freestream 13 to provide optimal sensitivity to the local heat transfer patterns, and therefore to the crossflow vorticity 14. Referring now to FIG. 3, the hot-film sensor elements 18 should be organized into a hot-film sensor array 19 with spacing 35 between the hot-film sensor elements 18. The spacing 35 shown is 0.05".

Positive and negative hot-film wire leads 23 are connected to hot-film elements 20 and to appropriate positive and negative solder pads 22. These hot-film lead wires 23 must be kept relatively short to minimize resistance. The solder pads 22 are fixed to substrate 17. Positive and negative instrument lead wires 24 are also attached to appropriate positive and negative solder pads 22. These instrument lead wires 24 pass through pressure holes (not shown) on the swept wing laminar surface 12 and connect to a standard constant temperature anemometer circuit (not shown) located inside the airplane. If a model is used, instrument lead wires 24 may lead to a remotely situated constant temperature anemometer circuit. As crossflow vortices 14 either increase or decrease the a local heat transfer over a hot-film sensor element 18, the constant temperature anemometer circuit will increase the voltage across its Wheatstone bridge to approximately raise or lower the temperature of hot-film sensor element 18 relative to neighboring hot-film sensor elements 18. Accordingly, those voltage signals generated by crossflow sensors 10 can detect and measure surface temperature, skin friction, turbulence transition, relative vorticity amplitude, as well as resolving the characteristics of vorticity wavelength and crossflow frequency in the case of nonmoving vortices. Furthermore, this non-invasive detection of crossflow vorticity 14 utilizes relatively non-expensive, readily available materials.

What is claimed is:

1. A crossflow sensor for measuring the behavior of crossflow vorticity over a laminar surface comprising:
   a plurality of crossflow sensors;
   a means for non-invasively adhering said crossflow sensors to said laminar surface;
   a means for sensing heat transfer rate changes caused by crossflow vorticity in said crossflow sensors;
   a means for arranging said crossflow sensors on said laminar surface to measure crossflow vorticity as a function of said heat transfer rate changes.

2. The device of claim 1 wherein said crossflow sensors comprise hot-film sensors mounted on a thermoplastic film sheet.

3. The device of claim 2 wherein said hot-film sensors comprise a metal heat sensor mounted on a polyimide film sheet.

4. The device of claim 3 wherein said metal heat sensor is constructed of nickel.

5. The device of claim 1 wherein said means for arranging said crossflow sensors on said laminar surface is a multi-element strip which in non-invasively adhered to said laminar surface, said multi-element strip having said crossflow sensors affixed thereto in an arrayed pattern, said affixed crossflow sensors being oriented in the direction of a freestream to detect relative changes in downstream crossflow vorticity amplitude in the downstream direction.

6. The device of claim 1 wherein the thickness of said crossflow sensor is less than h, where h is defined by the following equation:

$$h = \frac{1800 \times 12}{R'}$$

where R' is the unit Reynolds number of the freestream, whereby a local turbulence transition is avoided and no contamination of downstream crossflow vorticity measurements occurs.

7. The device of claim 1 wherein said means for sensing heat transfer rate changes is a constant temperature anemometer circuit.

8. The device of claim 1 wherein said means for arranging said crossflow sensors on said laminar surface is a multi-element strip which is non-invasively adhered to said laminar surface and has said crossflow sensors affixed thereto in a polar pattern to determine the frequency and wave angles of moving crossflow vortices.

9. The device of claim 1 wherein said means for arranging said crossflow sensor on said laminary surface is a multi-element strip which is non-invasively adhered to said laminar surface and has said crossflow sensors affixed thereto in an orthogonal pattern to determine the frequency and wave angles of moving crossflow vortices.

* * * * *